United States Patent

Valentine et al.

[11] Patent Number: 5,917,441
[45] Date of Patent: Jun. 29, 1999

[54] POLICE RADAR DETECTOR FOR SWEEPING K AND $K_A$ RADAR BANDS DURING ONE LOCAL OSCILLATOR SWEEP

[75] Inventors: Michael David Valentine; Clarence Richard Groth; Stephen Ray Scholl, all of Cincinnati, Ohio

[73] Assignee: Valentine Research, Inc., Cincinnati, Ohio

[21] Appl. No.: 08/928,565

[22] Filed: Sep. 12, 1997

[51] Int. Cl.[6] ........................................ G01S 7/40
[52] U.S. Cl. ................................. 342/20; 455/227
[58] Field of Search ............... 342/20; 455/227, 455/345

[56] References Cited

U.S. PATENT DOCUMENTS

| | | | |
|---|---|---|---|
| 4,939,521 | 7/1990 | Burin | 342/20 |
| 4,952,936 | 8/1990 | Martinson | 342/20 |
| 5,068,663 | 11/1991 | Valentine et al. | 342/20 |
| 5,083,129 | 1/1992 | Valentine et al. | 342/20 |
| 5,116,248 | 5/1992 | Hiers et al. | 439/669 |
| 5,146,226 | 9/1992 | Valentine et al. | 342/20 |
| 5,206,651 | 4/1993 | Valentine et al. | 342/20 |
| 5,268,689 | 12/1993 | Ono et al. | 342/20 |
| 5,305,007 | 4/1994 | Orr et al. | 342/20 |
| 5,315,302 | 5/1994 | Katsukura et al. | 342/20 |
| 5,446,923 | 8/1995 | Martinson et al. | 455/330 |

*Primary Examiner*—John B. Sotomayor
*Attorney, Agent, or Firm*—Killworth, Gottman, Hagan & Schaeff, L.L.P.

[57] ABSTRACT

A frequency scheme for a police radar detector enables the K band and the $K_a$ band to be scanned during a single sweep of a local oscillator which drives a mixer at its fundamental operating mode to produce intermediate frequency signals around 5 Ghz. The frequency scheme simultaneously activates two or four frequency conversion paths in the police radar detector. Accordingly, a radar warning alarm can be given upon detection of radar signals in any one of the frequency conversion paths. The ambiguity as to which one of the two or four frequency conversion paths is receiving a detected radar signal is resolved by applying first and second modulation signals to first and second local oscillators, respectively, so that the radar band of the detected radar signal can also be included within the radar warning alarm. The first and second modulation signals are in quadrature to one another and quadrature correlation is used to determine which frequency conversion path is receiving a radar signal.

24 Claims, 5 Drawing Sheets

POLICE RADAR DETECTOR FOR SWEEPING K AND $K_A$ RADAR BANDS DURING ONE LOCAL OSCILLATOR SWEEP

CROSS-REFERENCE TO RELATED APPLICATIONS

This application is related to the listed applications which have common inventors, are assigned to the same assignee as the present application, were filed on even date herewith and are entitled: POLICE RADAR DETECTOR INCLUDING NUISANCE ALERT SUPPRESSION, Ser. No. 08/928,780, filed Sep. 12, 1997; (Docket No. VAL041PA); INPUT STAGE FOR A POLICE RADAR DETECTOR, Ser. No. 08/929,355, filed Sep. 12, 1997; (Docket No. VAL042PA); and, INPUT STAGE FOR POLICE RADAR DETECTOR INCLUDING INPUT SIGNAL PREAMPLIFICATION, Ser. No. 08/928,960, filed Sep. 12, 1997 (Docket No. VAL043PA). These cross-referenced applications are incorporated herein by reference.

BACKGROUND OF THE INVENTION

The present invention relates in general to police radar detectors and, more particularly, to police radar detectors and methods of operating police radar detectors wherein selected operating frequencies permit a sweep of radar signals within the K and $K_a$ radar bands during one sweep of a local oscillator of a heterodyne receiver of the radar detector to produce intermediate frequency signals around 5 gigahertz (Ghz). The invention also resolves ambiguities which arise regarding the frequencies of detected police radar signals so that detection of radar signals within specific police radar bands are identified.

Police have used radar waves to monitor the speed of motor vehicles for many years. The frequencies currently licensed in the United States for police radar waves include: the X band—10.50 Ghz to 10.55 Ghz; the K band—24.05 Ghz to 24.25 Ghz; and, the $K_a$ band—33.40 Ghz to 36.00 Ghz. To alert motorists of the presence of police radar, electromagnetic signals within these police radar bands are monitored using a police radar detector which issues an audible and/or visual alert upon detection of a radar signal within one of bands.

Police radar detectors are basically superheterodyne radio receivers in which the tuning of the receivers is repeatedly swept through the frequencies which are to be received or detected, i.e., the frequencies of the licensed police radar bands. A typical superheterodyne radio receiver includes a mixer for receiving electromagnetic signals and a local oscillator (LO) signal to convert the frequency of the received signals to the frequency of an intermediate (IF) amplifier with the LO being swept in frequency to tune the required frequencies. Incoming electromagnetic signals can then be received at the LO frequency plus or minus the IF frequency. Generally, only one of these two signals, know as upper and lower sidebands, respectively, is to be received and the other or image frequency is suppressed by filtering or phasing to thereby perform single sideband (SSB) reception.

Frequencies used within a police radar detector, i.e., frequencies or swept frequency bands of local oscillators and frequencies of intermediate amplifiers, are referred to in the art as frequency schemes and a variety of frequency schemes are known and utilized in police radar detectors. For example, see U.S. Pat. Nos. 5,068,663; 5,268,689; and 5,305,007.

While known frequency schemes are satisfactory for operation of police radar detectors, there is an ongoing need for new and advantageous frequency schemes which improve operation of police radar detectors, reduce costs of manufacturing police radar detectors and/or simplify circuitry or operation of police radar detectors.

SUMMARY OF THE INVENTION

This need is currently met by the invention of the present application wherein a novel frequency scheme for a police radar detector enables two radar bands, the K band and the $K_a$ band, to be scanned during a single sweep of a local oscillator and produce intermediate frequency signals around 5 Ghz. The novel frequency scheme results in four frequency conversion paths being active simultaneously in the police radar detector. Accordingly, a radar warning alarm can be given upon detection of radar signals in any one of the frequency conversion paths. Preferably, the four level ambiguity as to which one of the four frequency conversion paths is receiving a detected radar signal is resolved so that the radar band of the detected radar signal can also be included within the radar warning alarm.

In accordance with one aspect of the present invention, a police radar detector comprises an antenna for receiving incoming electromagnetic signals. A first local oscillator generates a first local oscillator signal which is swept through a range of frequencies to sweep the K and $K_a$ police radar bands during a sweep of the first local oscillator signal. A first mixer is coupled to the antenna and the local oscillator for mixing the incoming electromagnetic signals with the first local oscillator signal to generate a first intermediate frequency signal. A first intermediate frequency amplifier, operating at around 5 gigahertz, amplifies the first intermediate frequency signal. And detector circuitry is coupled to the first mixer for detecting received electromagnetic signals within the K and $K_a$ police radar bands.

The detector circuitry preferably comprises a frequency modulation discriminator for generating a frequency modulation detection signal. The police radar detector may then further comprise modulation circuitry for connecting a modulation signal to the first local oscillator. Signal conditioning and control circuitry then utilizes the frequency modulation detection signal to determine whether detected electromagnetic signals are within the K police radar band or within the $K_a$ police radar band.

The police radar detector may further comprise a second local oscillator generating a second local oscillator signal at around 5.2 gigahertz, and a second mixer coupled to the first intermediate frequency amplifier and the second local oscillator to generate a second intermediate frequency signal at around 600 megahertz.

The police radar detector also may further comprise band switching circuitry coupled to the first mixer to switch the police radar detector to sweep the X police radar band. The first mixer may comprise a pair of antiparallel diodes having a near side coupled to the antenna and a far side coupled to the first intermediate frequency amplifier, and the band switching circuitry comprises circuitry for coupling a dc bias to the first mixer, preferably to the far side of the first mixer.

In accordance with another aspect of the present invention, a police radar detector comprises an antenna for receiving incoming electromagnetic signals and a first mixer coupled to the antenna for mixing the incoming electromagnetic signals with a first local oscillator signal to generate a first intermediate frequency signal. A first local oscillator generates the first local oscillator signal which is swept through a range of frequencies to sweep the K police radar band and the $K_a$ police radar band during a single sweep of the first local oscillator signal. A first intermediate frequency amplifier operates around 5 gigahertz to amplify the first intermediate frequency signal. A second local oscillator generates a second local oscillator signal around 5.2 gigahertz and a second mixer coupled to the first intermediate frequency amplifier and the second local oscillator generates a second intermediate frequency signal around 600 megahertz. Detector circuitry is coupled to the second mixer and includes a frequency modulation discriminator for generating a frequency modulation detection signal. Signal conditioning and control circuitry is coupled to the detection circuitry and modulation circuitry is coupled between the signal conditioning and control circuitry and the first and second local oscillators for connecting a first modulation signal to the first local oscillator and a second modulation signal generated by the signal conditioning and control circuitry to the second local oscillator. The signal conditioning and control circuitry utilizes the frequency modulation detection signal to determine whether a detected radar signal is within the K police radar band or the $K_a$ police radar band.

In accordance with still another aspect of the present invention, a police radar detector comprises an antenna for receiving incoming electromagnetic signals with a heterodyne receiver being connected to the antenna and including a mixer operable in the mixer's fundamental operating mode for sweeping the receiver to detect the electromagnetic signals within the K police radar band and the $K_a$ police radar band during a single sweep of the receiver.

In accordance with yet another aspect of the present invention, a method for operating a police radar detector comprises the steps of: receiving electromagnetic signals; providing a heterodyne receiver having a mixer; and, operating the mixer in a fundamental operating mode to detect received electromagnetic signals within the $K_a$ radar band and the K radar band during a single frequency sweep of the heterodyne receiver.

In accordance with yet still another aspect of the present invention, a method of operating a police radar detector comprises the steps of: heterodyning received electromagnetic signals in a mixer driven by a local oscillator; operating the mixer in the mixer's fundamental operating mode by sweeping the local oscillator to detect the electromagnetic signals within the $K_a$ radar band and the K radar band in a single frequency sweep of the local oscillator; introducing a modulation signal into detected electromagnetic signals within the $K_a$ radar band and the K radar band; and, determining whether the detected electromagnetic signals are within the $K_a$ radar band and the K radar band based on the modulation signal.

In accordance with an additional aspect of the present invention, a method of operating a police radar detector comprises the steps of: heterodyning received electromagnetic signals in a receiver including a mixer driven by a local oscillator; operating the mixer in the mixer's fundamental operating mode; sweeping the local oscillator through a single frequency sweep to simultaneously sweep the electromagnetic signals within a plurality of frequency bands covering at least the $K_a$ radar band and the K radar band; modulating the local oscillator of the receiver with a modulation signal; detecting the modulation signal to generate frequency modulation detection signals; and, determining whether the electromagnetic signals are within the $K_a$ radar band or the K radar band based on the frequency modulation detection signals.

It is, thus, an object of the present invention to provide a novel frequency scheme for a police radar detector; to provide a novel frequency scheme for a police radar detector which enables the detector to simultaneously scan the K radar band and the $K_a$ radar band and generate intermediate frequency signals around 5 Ghz; to provide a novel frequency scheme for a police radar detector wherein the detector simultaneously scans the K radar band and the $K_a$ radar band utilizing a fundamental operating mode of a mixer circuit; and, to provide a novel frequency scheme for a police radar detector which enables the detector to simultaneously scan the K radar band and the $K_a$ radar band and to determine within which one of the radar bands a detected radar signal has been received.

Other objects and advantages of the invention will be apparent from the following description, the accompanying drawings and the appended claims.

DETAILED DESCRIPTION OF THE INVENTION

Figure 1:
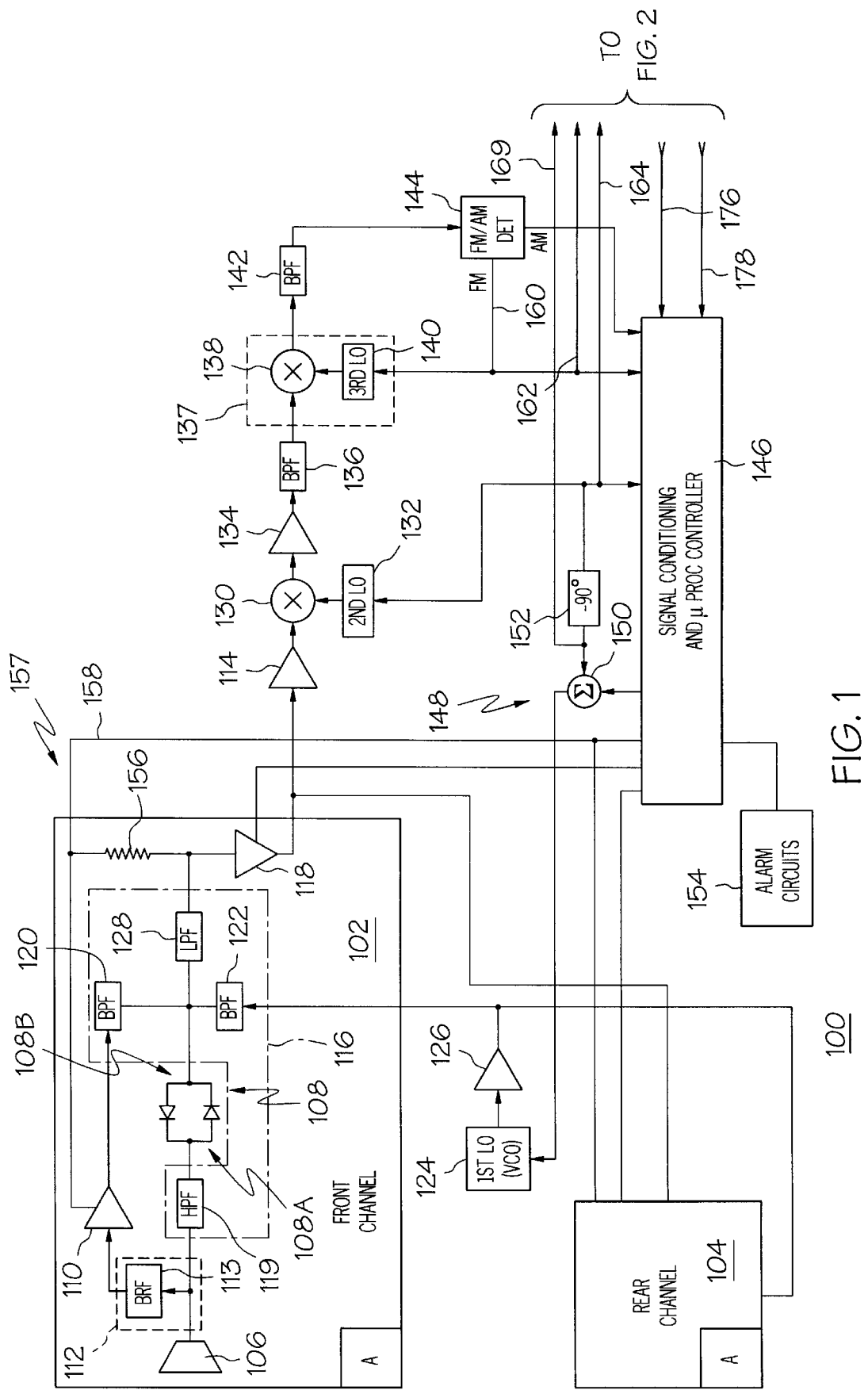
FIG. 1 is a schematic block diagram of a police radar detector for practicing the invention of the present application.

Reference will now be made to FIG. 1 which illustrates, in schematic block diagram form, a police radar detector 100 utilizing heterodyne receiver principles and being suitable for practicing the invention of the present application. The police radar detector 100 includes two input stages 102, 104 which are substantially the same so that only the input stage 102 will be described herein. The input stages 102, 104 correspond to a front channel and a rear channel, respectively. Operation of the radar detector 100 using the two input stages 102, 104, or the front and rear channels, is for detecting police radar signals and determining the directional origin of the signals as taught in U.S. Pat. No. 5,083,129 which is assigned to the same assignee as the present application and is incorporated herein by reference.

The input stage 102 includes an antenna 106, such as a microwave horn, for receiving incoming electromagnetic signals. The antenna 106 is coupled to a first mixer 108 and preamplification circuitry comprising an X band preamplifier 110 by a diplexer 112. In the illustrated embodiment of the police radar detector 100, the diplexer 112 comprises a K band and $K_a$ band rejection filter 113 which rejects frequencies in a band extending from approximately 24 gigahertz (Ghz) to approximately 36 Ghz. The first mixer 108 as illustrated comprises a pair of antiparallel diodes having a near side 108A coupled to the antenna 106 by the diplexer 112 and a far side 108B coupled to the antenna 106 through a first portion of a novel passive multiplexer 116 and to a first intermediate frequency (IF) amplifier 114 through a second portion of the novel passive multiplexer 116 and a first IF preamplifier 118. The first IF preamplifier 118 and first IF amplifier 114 are centered around 5 Ghz.

The passive multiplexer 116 comprises: a high pass filter 119 coupled between the antenna 106 and the first mixer 108 for passing signals in the police radar K band, i.e., from approximately 24.05 Ghz to approximately 24.25 Ghz, and the police $K_a$ band, i.e., from approximately 33.40 Ghz to approximately 36.00 Ghz, to the near side 108A of the first mixer 108; a first bandpass filter 120 which is designed to pass frequencies in the police radar X band, i.e., from approximately 10.50 Ghz to approximately 10.55 Ghz, to the far side 108B of the mixer 108; and, a local oscillator or second bandpass filter 122 which is designed to pass first local oscillator (LO) signals to the far side 108B of the first mixer 108.

The first LO signals are generated by a first local oscillator (LO) 124 and amplified by an amplifier 126. In the illustrated embodiment, the first LO 124 comprises a voltage controlled oscillator (VCO) and generates signals which sweep in frequency from approximately 15.149 Ghz to approximately 15.079 Ghz for sweeping the X band and from approximately 15.149 Ghz to approximately 14.310 Ghz for simultaneously sweeping the K band and the $K_a$ band. The high pass filter 119 substantially prevents LO signals from being passed to and broadcast from the antenna 106 by serving as a short to ground for the LO signals so that the LO drive is delivered substantially to the mixer diodes with relatively little LO power being delivered to the antenna 106. The passive multiplexer 116 also comprises a low pass filter 128 which is designed to pass frequencies from direct current (dc) to approximately 6 Ghz. The band rejection filter 113, which forms the diplexer 112, can also be considered as forming part of the passive multiplexer 116 since the passive multiplexer 116 must perform the functions of interconnecting the antenna 106, the first LO 124, the first mixer 108 and the first IF amplifier 114 with minimal loss from each source of signals to its respective destination.

In the input stage topology, illustrated by the input stage 102, including the connection of the X band preamplifier 110 to the far end 108B of the mixer 108, the mixer 108 provides additional attenuation of any signals which may feedback toward the input of the X band preamplifier 110. Attenuation of these feedback signals reduces the possibility of oscillation of the X band preamplifier 110. The input stage topology all provides a very direct and low loss path for K band and $K_a$ band signals from the antenna 106 to the near end 108A of the mixer 108 which is believed to result in a favorable noise figure on the K and $K_a$ band. More conventional input stage connections recombine preamplified X band signals with a passive K band and $K_a$ band path and apply the recombined signals to a single terminal of the mixer. Such input stages or networks are believed to have higher insertion loss on the K and $K_a$ bands which leads to a commensurate increase in noise figure.

Signals from the first IF amplifier 114 are passed to a second mixer 130 which can be a pair of antiparallel diodes or other appropriate known mixer circuit. The second mixer 130 also receives second LO signals generated by a second LO 132 having a frequency of approximately 5.2 Ghz in the illustrated embodiment. Signals from the second mixer 130 are passed to a second IF amplifier 134 and a bandpass filter 136 both having a frequency of around 600 megahertz (Mhz), preferably around 611 Mhz. The bandpass filter 136 is connected to a single sideband down converter 137 comprising a third mixer 138 and a third LO 140 operating at 611.3 Mhz to down convert signals to approximately 300 kilohertz (Khz). The single sideband down conversion avoids degradation of the system noise figure by approximately 3 dB. The circuitry beyond the second LO 132 forms detector circuitry for detecting electromagnetic signals in the police radar bands.

A 300 Khz bandpass filter 142 passes signals from the down converter 137 to an amplitude detector and frequency modulation (FM) detector circuit 144, sometimes referred to as a discriminator or demodulator circuit, which operates in a manner disclosed in U.S. Pat. No. 5,068,663 which is assigned to the same assignee as the present application and is incorporated herein by reference. The FM output or frequency demodulation detection signal from the circuit 144 is passed to the third LO 140 to lock the radar detector 100 onto incoming electromagnetic signals and also to signal conditioning and control circuitry 146 which includes a processor, preferably any one of a number of appropriate microprocessors.

Modulation circuitry 148, comprising a summer 150 and a 90° phase shifter circuit 152, coupled between the signal conditioning and control circuitry 146 and the first and second LO's 124, 132 connect a first modulation signal to the first local oscillator 124 and a second modulation signal, directly generated by the signal conditioning and control circuitry 146, to the second local oscillator 132. Upon detecting a valid police radar signal, the signal conditioning and control circuitry 146 activate alarm circuits 154 which can be audible, visual including numeric, directional arrows, or other appropriate for a given alerting arrangement in a known manner.

With the understanding of the radar detector 100 gained from the above overview, various aspects of the radar detector 100 will now be described in more detail. The frequencies that must be scanned to cover the police radar bands licensed in the United States are: the X band—10.50 Ghz to 10.55 Ghz; the K band—24.05 Ghz to 24.25 Ghz; and, the $K_a$ band—33.40 Ghz to 36.00 Ghz. The frequency scheme of the radar detector 100, i.e., the frequencies used within a police radar detector including frequencies or swept frequency bands of local oscillators and frequencies of intermediate amplifiers, provides for sweeping first and second police radar bands, the K band and the $K_a$ band, during a single sweep of the first LO signal generated by the first LO 124 under the control of the signal conditioning and control circuitry 146.

In particular, the 611 MHz second IF amplifier 134 in conjunction with the 5.2 Ghz second LO 132 lead to potential reception of signals at 5.811 Ghz and 4.589 Ghz, i.e., 5.2 Ghz±611 Mhz, in the first IF amplifier 114 and the first IF preamplifier 118. Rather than suppressing one of these responses as undesired, which is commonly done, the radar detector 100 retains both responses at roughly comparable sensitivities to simplify coverage of the police radar bands. These two IF responses, 5.811 Ghz and 4.589 Ghz, combine with the first LO signals from the first LO 124 to yield a total of four receive frequencies, i.e., first LO±5.811 Ghz and first LO±4.589 Ghz.

Reference should now be made to Table 1 which details the frequencies adopted in the illustrated embodiment of the radar detector 100. Each row in Table 1 is labeled with a reference number, i.e., rows 1–8, in the first column. In rows 1–4, the first LO 124 signal (Fvco) is swept from approximately 15.149 Ghz to approximately 14.310 Ghz as shown in the second column of Table 1. In the fundamental operating mode of the first mixer 108, the local oscillator frequency is inherently doubled to yield injection of first local oscillator signals (F1) having frequencies which are swept from 30.298 Ghz to 28.620 Ghz as shown in column three. The frequency doubling is due to the antiparallel diodes of the first mixer 108 conducting on alternate half-cycles of the LO signal from the first LO 124 in the fundamental operating mode.

The fourth column in each row shows the four different functions or equations which describe frequency conversion from the frequency of received electromagnetic signals (Frf) to the output (F3) of the second IF amplifier 134 at approximately 611 Mhz. The fifth column lists the corresponding frequency ranges of incoming electromagnetic signals Frf that are searched as the first LO 124 is swept across its tuning bandwidth. The sixth or Coverage column of Table 1 shows the particular police radar bands or portions of bands which are covered by the receiver responses. In the last column of Table 1, the frequency equations of the third column of Table 1 are solved for the second IF amplifier 134 output, F3. These relationships are repeated for convenience in Table 2 which will be referred to later herein.

To provide coverage of the X band, the operating mode of the first mixer 108 is switched between the K/$K_a$ band operating mode and the X band operating mode by band switching circuitry 157 comprising a resistor 156 and a conductor 158 which extends between the signal conditioning and control circuitry 146 and the X band preamplifier 110. The signal conditioning and control circuitry 146 is thereby able to apply a direct current (dc) bias to the diodes which make up the first mixer 108 through the low pass filter 128, i.e., to the far side 108B of the first mixer 108. The dc bias upsets the balance of the diodes which make up the first mixer 108 so that one of the diodes is forward biased and the other diode is reversed bias. This dc bias causes the first mixer 108 to mix more efficiently with the fundamental of the applied first LO signals rather than the second harmonic of the signals generated by the first LO 124. In addition, the tuning range of the VCO making up the first LO 124 is reduced to a fraction of the range employed in the K/$K_a$ operating mode. The dc bias also enables the X band preamplifier 110 which is disabled during the K/$K_a$ operating mode. The changed operating mode for X band reception is indicated in rows 5–8 of Table 1. Note that once again four responses are generated. In the X-band mode of operation, only the response of row 7 provides a signal of interest. Accordingly, to reduce noise within the radar detector 100, the X band preamplifier 110 may be designed to suppress unwanted responses.

The frequency scheme of the police radar detector 100 as described and illustrated in Table 1 is advantageous in that the responses of rows 1–4 each deliver signals of interest over at least a portion of their respective tuning ranges. This approach enjoys better noise figure relative to existing designs that employ second harmonic mixing for the K band and third harmonic mixing for the $K_a$ band. Using the first IF responses in the 5 Ghz range allows the K and $K_a$ bands to be swept simultaneously, i.e., during a single sweep of the first LO 124. For example, a 5.0 Ghz IF yields two receiver responses 10 Ghz apart, allowing 24.0 Ghz and 34.0 Ghz to be tuned simultaneously. By extension, using two responses, e.g., at 4.589 Ghz and 5.811 Ghz, allows the $K_a$ band to be covered with reduced vco tuning bandwidth. It is noted that in the process of covering the 2.6 Ghz wide $K_a$ band, the receiver also scans other frequencies that must ultimately be ignored. The ability to ignore these unwanted signals is performed by a combination of frequency calibration of the first LO 124, i.e., the point in the sweep at which a signal is detected is monitored as disclosed in referenced U.S. Pat. No. 5,068,663; and, by being able to identify the active mixer sidebands as will now be described.

An important feature of most radar detectors is the ability not only to generate a warning or alert when a radar signal is received, but also to identify the radar band in which the signal originates. When a signal is received in the radar detector 100, the frequency of the first LO 124 is known because of calibration of the first LO 124, i.e., the point in the sweep of the first LO 124 at which a signal is detected is noted by the signal conditioning and control circuitry 146 as described above. However, four frequency conversion paths are active simultaneously in the police radar detector 100 so it is not immediately apparent which receiver response is producing the signal. This four level ambiguity in the received frequency must be resolved in order to uniquely identify the origin of an incoming signal.

The circuit 144 includes an FM detector which generates a frequency demodulation detection signal as its output. If a modulation signal, such as a 500 hertz sine wave, is applied for example to the second LO 132, the modulation will be superimposed upon the received signal and will appear at the FM detector output 160. The detected modulation will be either in phase or 180° out of phase with the applied modulation, depending on whether the signal path was the upper sideband or the lower sideband of the second mixer. Analogous results occur if modulation is applied to the first LO 124. Thus, if a modulation signal, such as a 500 hertz sine wave, is applied to the first LO 124, the modulation will be superimposed upon the received signal and will appear at the FM detector output 160. Again, the detected modulation will be either in phase or 180° out of phase with the applied modulation, depending on whether the signal path was the upper sideband or the lower sideband of the first mixer. These operations are illustrated in Table 2 which shows the frequency conversion equations of the fourth column of Table 1 solved for the IF output frequency, F3, at 611 Mhz.

TABLE 1

Receiver Frequency Scheme

| Ref. | Fvco | F1 | Frf Function | Frf | Coverage | IF Function |
|---|---|---|---|---|---|---|
| 1) | 15.149 —> 14.310 | 30.298 —> 28.620 | Frf = F1 + F2 + F3 | 36.109 —> 34.431 | Top of Ka | F3 = Frf − F1 − F2 |
| 2) | 15.149 —> 14.310 | 30.298 —> 28.620 | Frf = F1 + F2 − F3 | 35.487 —> 33.209 | Boftom of Ka | F3 = −Frf + F1 + F2 |
| 3) | 15.149 —> 14.310 | 30.298 —> 28.620 | Frf = F1 − F2 + F3 | 25.709 —> 24.031 | K | F3 = Frf − F1 + F2 |
| 4) | 15.149 —> 14.310 | 30.298 —> 28.620 | Frf = F1 − F2 − F3 | 24.487 —> 22.809 | Interference & K | F3 = Frf + F1 − F2 |
| 5) | 15.149 —> 15.079 | 15.149 —> 15.079 | Frf = F1 + F2 + F3 | 20.960 —> 20.890 | Of no interest | F3 = Frf − F1 − F2 |
| 6) | 15.149 —> 15.079 | 15.149 —> 15.079 | Frf = F1 + F2 − F3 | 19.738 —> 19.668 | Of no interest | F3 = −Frf + F1 + F2 |
| 7) | 15.149 —> 15.079 | 15.149 —> 15.079 | Frf = F1 − F2 + F3 | 10.560 —> 10.490 | X | F3 = Frf− F1 + F2 |
| 8) | 15.149 —> 15.079 | 15.149 —> 15.079 | Frf = F1 − F2 − F3 | 9.338 —> 9.268 | Of no interest | F3 = −Frf + F1 − F2 |

F1 is the first mixer local oscillator injection and is 2*Fvco in Responses 1–4; F1 = Fvco in responses 5–8.
F2 is the second mixer local oscillator frequency (5.2 Ghz).
F3 is the second intermediate amplifier frequency (611 Mhz).

TABLE 2

FM Detection Phase

| Ref. | IF Function | Slope F3/F1 | F3/F2 |
|---|---|---|---|
| 1) | F3 = Frf − F1 − F2 | −1 | −1 |
| 2) | F3 = Frf + F1 + F2 | +1 | +1 |
| 3) | F3 = Frf − F1 + F2 | −1 | +1 |
| 4) | F3 = −Frf + F1 − F2 | +1 | −1 |
| 5) | F3 = Frf − F1 − F2 | −1 | −1 |
| 6) | F3 = Frf + F1 + F2 | +1 | +1 |
| 7) | F3 = Frf − F1 + F2 | −1 | +1 |
| 8) | F3 = −Frf + F1 − F2 | +1 | −1 |

Examining the response of row 3, for example, if frequency modulation is applied to the first LO 124, increasing F1 produces decreasing F3. The detected frequency modulation would thus be 180° out of phase with the applied modulation. Conversely, modulating the second LO 132 upward in frequency would generate increasing F3. Thus, detected FM would be in phase with modulation applied to F2. Stated differently, the partial derivatives or slopes of F3 with respect to F1 and F2 are −1 and +1, respectively. These slopes for the four receiver responses are tabulated in Table 2. Inspection reveals four different combinations that in 2-bit binary fashion determine the active signal path.

When a signal is acquired, the signal conditioning and control circuitry 146 of the radar detector 100 performs these operations to identify the active frequency conversion function. Measurement is accomplished in an economical manner by employing orthogonal modulation at the two local oscillators that is analogous to quadrature phase shift keying (QPSK) used in data communication. Synchronous quadrature correlation of the detected frequency modulation yields either positive or negative correlation with each local oscillator. The correlations correspond directly to the aforementioned slopes, thus resolving the frequency ambiguity. It is therefor apparent that −1, −1 and +1, +1 identify a detected incoming signal as being in the $K_a$ band while −1, +1 and +1, −1 identify a detected incoming signal as being in the K band. When detecting X band, −1, +1 identify a detected incoming signal as being in the X band.

Figure 5:
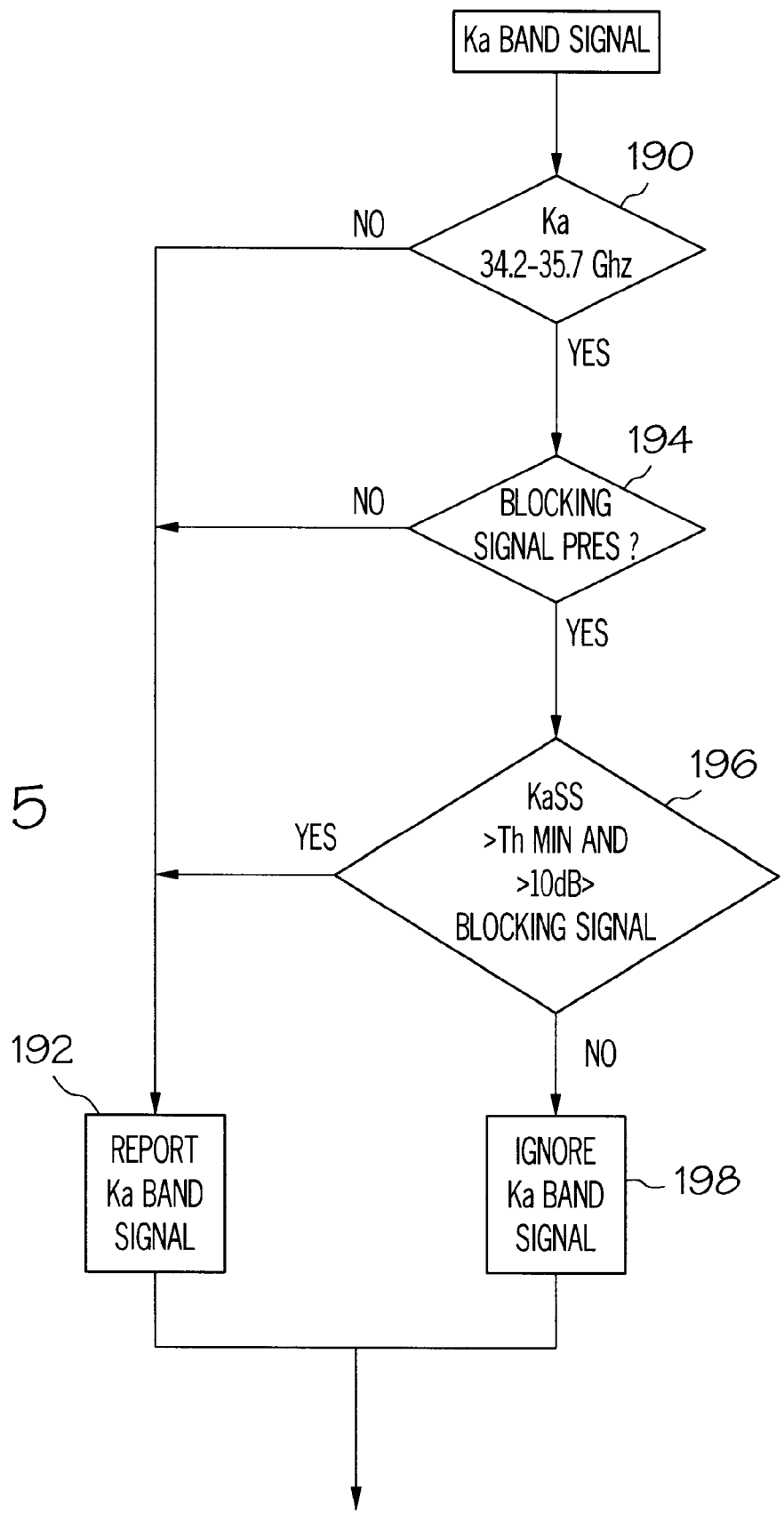
FIG. 5 is a flow chart for processing $K_a$ band signals to determine whether they are likely produced by a nearby radar detector and should therefor be suppressed.

A hardware implementation of quadrature correlation is conceptually illustrated in the schematic block diagram of FIG. 5. The signal conditioning and control circuitry 146 of the police radar detector 100 generates a 500 Hz sine wave which is passed through the modulation circuitry 148 to result in a first modulation signal being applied to the first LO 124 with the 500 Hz signal serving as a second modulation signal which is applied to the second LO 132. Thus, the first and second modulation signals are in quadrature to one another.

Correlated detection is performed by multiplying or mixing the detected FM signal on a conductor 162 with the 500 Hz signal generated by the signal conditioning and control circuitry 146 on a conductor 164 in a mixer circuit 166 and integrating the result over one or more integer periods of the modulation in a first integrator circuit 168; and, mixing the detected FM signal on the conductor 162 in a mixer 167 with the 500 Hz signal which has been shifted by −90° on the conductor 169 and integrating the result over one or more integer periods of modulation in a second integrator circuit 170. The output signals from the integrator circuits 168 and 170 are passed through threshold circuits 172, 174, respectively, to generate the +1 or −1 slopes which are sent to the signal conditioning and control circuitry 146 on conductors 176, 178 where the operations described above are performed to determine the radar bands of received electromagnetic signals.

It is well known from modem theory that the quadrature modulation arrangement allows two independent data bits to be transmitted simultaneously. In analogous fashion, the quadrature modulation arrangement permits characterization of both frequency conversions simultaneously and operates with an economy of hardware and signal analysis time. While a hardware implementation is shown in FIG. 2, the synchronous quadrature correlation for the radar detector 100 is preferably implemented by digitizing the detected FM signal and performing the multiplications and integrations numerically in software within a microprocessor of the signal conditioning and control circuitry 146.

Figure 2:
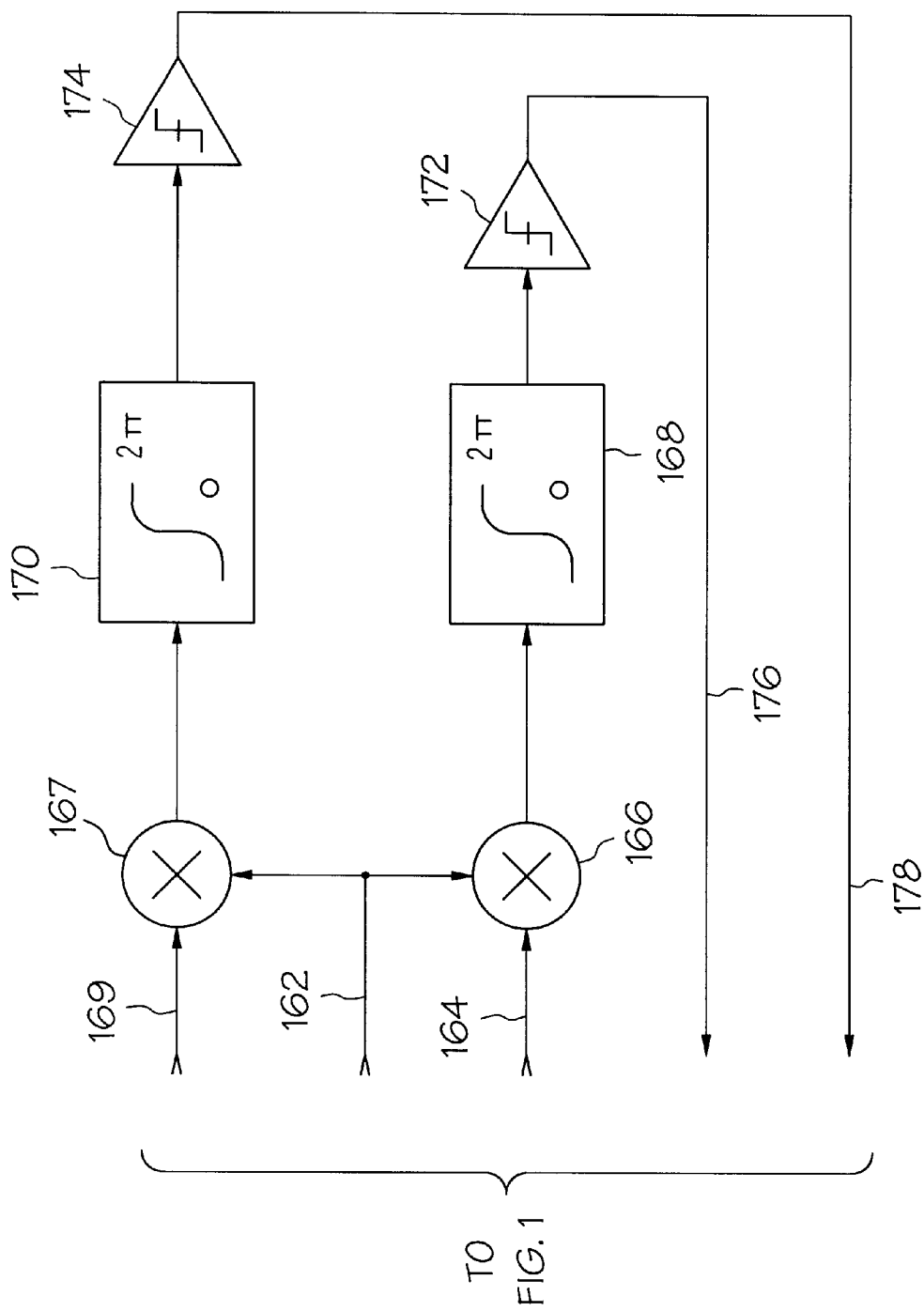
FIG. 2 is a schematic block diagram illustrating quadrature correlation for the resolution of frequency ambiguities in the police radar detector of FIG. 1.

The quadrature correlation technique is very economical since the 90° phase shifter circuit 152 can be constructed in a conventional manner using only one capacitor and a few resistors and the quadrature detection requires only additional software for performing operations corresponding to the operations performed by the hardware of FIG. 2. While the above described modulation/quadrature correlation techniques are preferred for the radar detector 100, it is apparent that other modulation techniques can also be utilized. For example, modulation signals having different frequencies can be applied to one or both mixers.

By using the above described techniques, the frequency of any signal detected by the radar detector 100 can be uniquely identified. A review of rows 1–4 of Table 1 shows that some portions of the K band, from 24.031 Ghz to 24.487 Ghz, and some portions of the $K_a$ band, from 34.431 Ghz to 35.487 Ghz are scanned twice because of overlapping frequency coverage. Accordingly, indiscriminate counting of valid K and $K_a$ band responses would lead to some double counting of signals lying within the overlapping regions. To overcome these counting problems, the radar detector 100 is characterized during manufacturing to determine the A/D codes of the sweep signals corresponding to 34.431 Ghz in row 2 and 35.487 Ghz in row 1. The measured codes are stored so that they can be used in connection with band identification to avoid double counting of signals within the overlapping regions. Double counting of K band signals is precluded by simply ignoring K band signals received in the responses of row 4 of Table 1. This signal identification permits determination of the accurate number of radar sources incident on the radar detector 100 so that the user of the radar detector 100 can be notified. Detection and alerting of multiple radar sources is described in U.S. Pat. No. 5,146,226 which is assigned to the same assignee as the present application and is incorporated herein by reference.

Signal processing is also performed to ensure proper signal counting as well as to provide better operation of the radar detector 100. As noted above, single sideband (SSB) suppression is employed in the third mixer 138 of the single sideband down converter 137 to avoid degradation of the system noise figure by approximately 3 dB. The 611 Mhz SSB down converter improves noise figure by suppressing image noise in the undesired response or sideband. Modest amounts of suppression are required to attain most of the available 3 dB improvement, for example 10 dB image suppression achieves a 2.6 dB improvement. However, it is impractical to achieve perfect rejection and insufficient suppression of the undesired sideband can result in inaccurate signal strength assessment and an inaccurate determination of the number of radar sources which are incident on the radar detector 100 at any given time. A strong signal appearing in the desired sideband would of course be counted, but this same strong signal leaking through an imperfectly suppressed sideband must not be counted as an additional signal.

The possible double counting is ameliorated by employing a final IF of only 300 Khz. The image response is then only 600 Khz away, about at the quantization resolution of the analog-to-digital (A/D) used for input to the microprocessor of the signal conditioning and control circuitry 146, and no attempt is made to attain such fine resolution within the nearly 3 Ghz of scanned spectrum. In addition, once a signal has been acquired and characterized by the radar detector 100, the sweep voltage of the VCO forming the first oscillator 124 of the illustrated embodiment is controlled to skip the sweep voltage by a few megahertz before sweeping is continued so that the same signal cannot be reacquired. Thus, an image only a few hundred kilohertz away would be skipped over and not counted thus avoiding any double counting.

However, a false lock can occur if a sufficiently strong signal is swept downward in frequency. Such a strong signal will enter the final IF via an incompletely suppressed upper sideband and it is probable that the radar detector will lock to the signal. Under these circumstances, the sense of the FM feedback loop is effectively reversed and when FM feedback equilibrium is achieved, the signal lies on the skirt of the IF rather than at or near its center. The result is that the very strong signal will be misrepresented as a weak signal. And, the correct strong response will be skipped over as described above so correct assessment of signal strength is blocked.

To overcome this problem, the radar detector 100 system must be controlled to ensure that it reliably locks to the received signal. How this is accomplished in the radar detector 100 will now be described. After the detector has parked on a signal and characterized the signal strength of the signal, the SSB suppression is disabled so that the third mixer 138 operates as a dual conversion mixer, i.e., with equal sensitivity on the upper and lower sidebands. At the same time, a unity gain inverter is inserted into the FM feedback loop and signal strength is remeasured. One of two possibilities arises. If the signal was previously detected in the desired sideband, the FM feedback will now be in the wrong sense and the signal will move to the IF or filter skirt resulting in a low signal strength or even complete loss of signal. On the other hand, if the signal was previously detected in the suppressed or undesired sideband, the FM feedback will now be in the correct sense and the signal will move to the center of the IF or filter. Further, the sideband is no longer rejected and the signal path gain will rise with both mechanisms contributing to dramatically improved signal strength. The higher of the two signal strength measurements is the valid characterization with a 6 dB correction being made to the raw measurement because the double sideband conversion turns out to have a 6 dB lower gain than SSB operation.

An important aspect of the radar detector 100 is its ability to suppress nuisance alerts due to incoming signals other than police radar and, in particular, incoming signals which are generated by other radar detectors. Due to the unique frequency scheme used for the radar detector 100, nuisance alerts due to the third harmonic (34.65 Ghz) of leakage from other radar detectors around 11.55 Ghz, which is a commonly used LO frequency in many radar detectors currently in use, can be readily processed.

A review of Table 1 shows that the frequencies of received electromagnetic signals (Frf) which are scanned by the first LO 124 during each simultaneous sweep of the K band and the $K_a$ band include 22.809 Ghz through 24.487 Ghz, see row 4 of Table 1. This frequency range is referred to as Interference & K band signals and includes signals around 23.1 Ghz, which is the second harmonic of a LO operating around 11.55 Ghz. While signals around 23.1 Ghz would normally be considered to be interference, in the radar detector 100, these signals are detected during normal scanning operations so that they are available to help determine whether an alarm in a corresponding portion of the $K_a$ band is an actual police radar signal or only a signal leaked from a LO of a nearby radar detector operating at a nominal 11.55 Ghz. Thus, no LO switching or other reconfigurations of the radar detector 100 circuitry need to be made to detect these potentially alert blocking signals.

Signals in the $K_a$ band within a range of frequencies that could be present due to leaked third harmonics of LO signals of a nearby radar detector are processed for possible suppression. Given a commonly used nominal LO frequency of 11.55 Ghz and allowing a range of typically 11.4 to 11.9 Ghz, the suspect range of frequencies deemed to be possible third harmonic spurious LO signals in a working embodiment of the radar detector 100 is then from about 34.2 Ghz to about 35.7 Ghz, see 190 in FIG. 5. If a detected $K_a$ band signal is not within the suspect range, the detected $K_a$ band signal is reported, see 192 in FIG. 5.

If a detected $K_a$ band signal is within the suspect range, a determination is made as to whether a potential alert blocking signal is present at the second harmonic frequency of the fundamental frequency which would generate the suspect $K_a$ band signal as its third harmonic, see 194 in FIG. 5. In the illustrated embodiment, the alert blocking signal which is checked has a frequency which is ⅔ the frequency of the detected $K_a$ signal plus or minus a guard band, for example the checked blocking signal may be ⅔ the detected $K_a$ signal ±40 Mhz, and is within a range of frequencies from about 22.813 Ghz to about 23.8 Ghz. If no blocking signal has been detected within about 10 seconds before or within three sweeps after detection of the $K_a$ band signal in the suspect range, the detected $K_a$ band signal is reported.

It is noted that other criteria can be used in the radar detector 100 for selecting the alert blocking signal or signals to be checked for suppressing nuisance alerts as well as the detection times for those blocking signals. For example, any signal within a range of frequencies corresponding to the second harmonic of nominal 11.55 Ghz signals, such as from about 22.813 Ghz to about 23.8 Ghz, could be used to block a corresponding block of $K_a$ band signals ranging, for example, from about 34.2 Ghz to about 35.7 Ghz. If a blocking signal is detected, the signal strength of the detected $K_a$ band signal is examined, see 196 in FIG. 5.

If the $K_a$ band signal strength is greater than a reporting threshold, for example around −92 dBm/cm², and also is greater than the signal strength of the blocking signal by a minimum threshold, for example around 10 dB, the detected $K_a$ band signal is reported. Otherwise the detected $K_a$ band signal is ignored, i.e., it is treated as a nuisance signal generated by a nearby radar detector and is suppressed, see 198 in FIG. 5. This arrangement is superior to other known implementations since it preserves the ability to report real $K_a$ band radar signals in the presence of third harmonic spurious emission from other radar detectors which may be operating nearby.

The radar detector 100 includes simplified and economical input stages 102, 104 which satisfy requirements for frequency preselection to improve the noise figure and sensitivity of the police radar detector 100. As previously noted, the input stages 102, 104 are substantially the same so that only the input stage 102 will be described herein. In the input stage 102 illustrated in FIG. 1, a preamplifier 110 is provided for coupling X band signals from the antenna 106 to the first mixer 108 with K and $K_a$ band signals being passively coupled from the antenna 106 to the first mixer 108.

Figure 3:
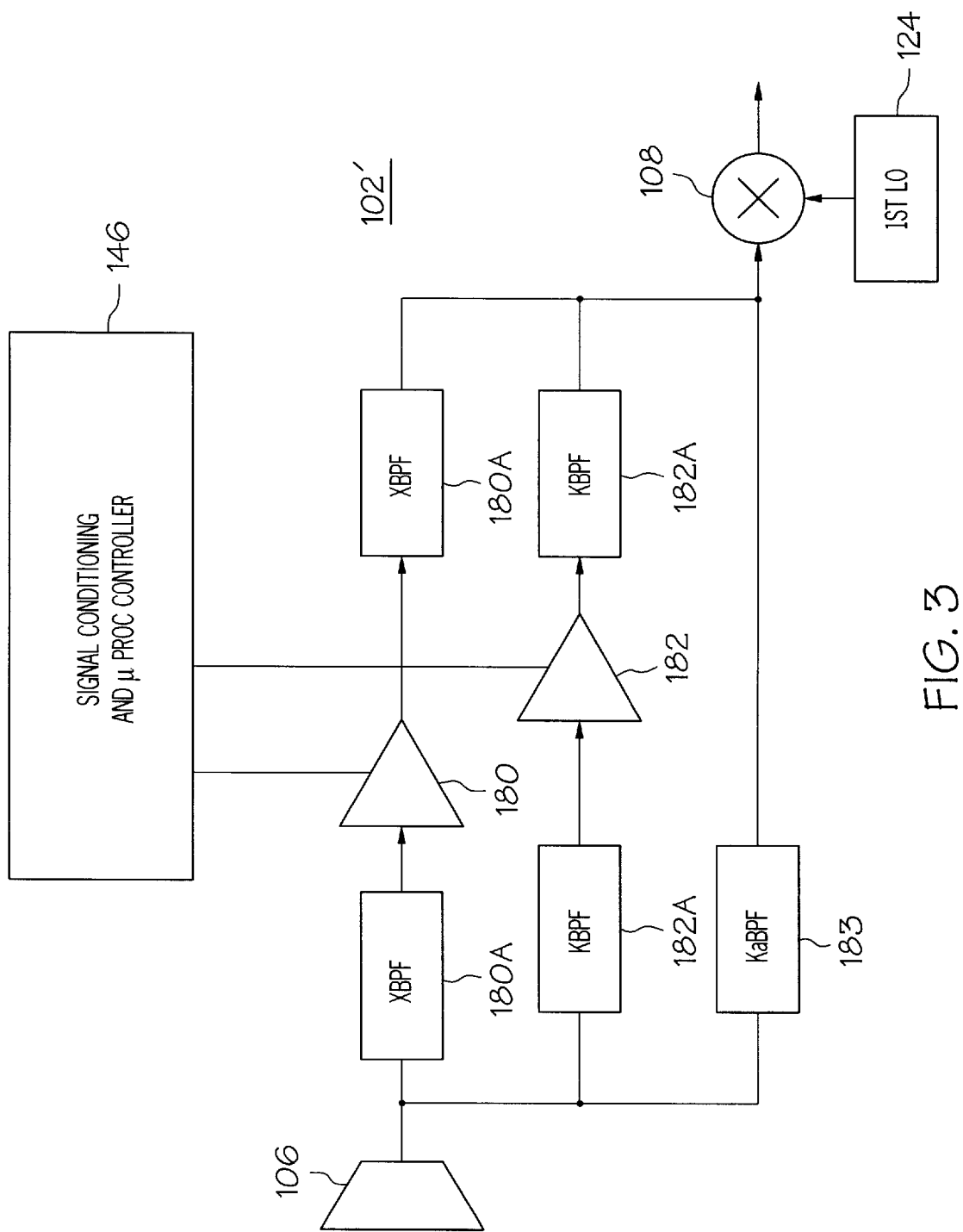
FIGS. 3 and 4 are schematic block diagrams illustrating alternate embodiments of input stages for the police radar detector of FIG. 1.
Figure 4:
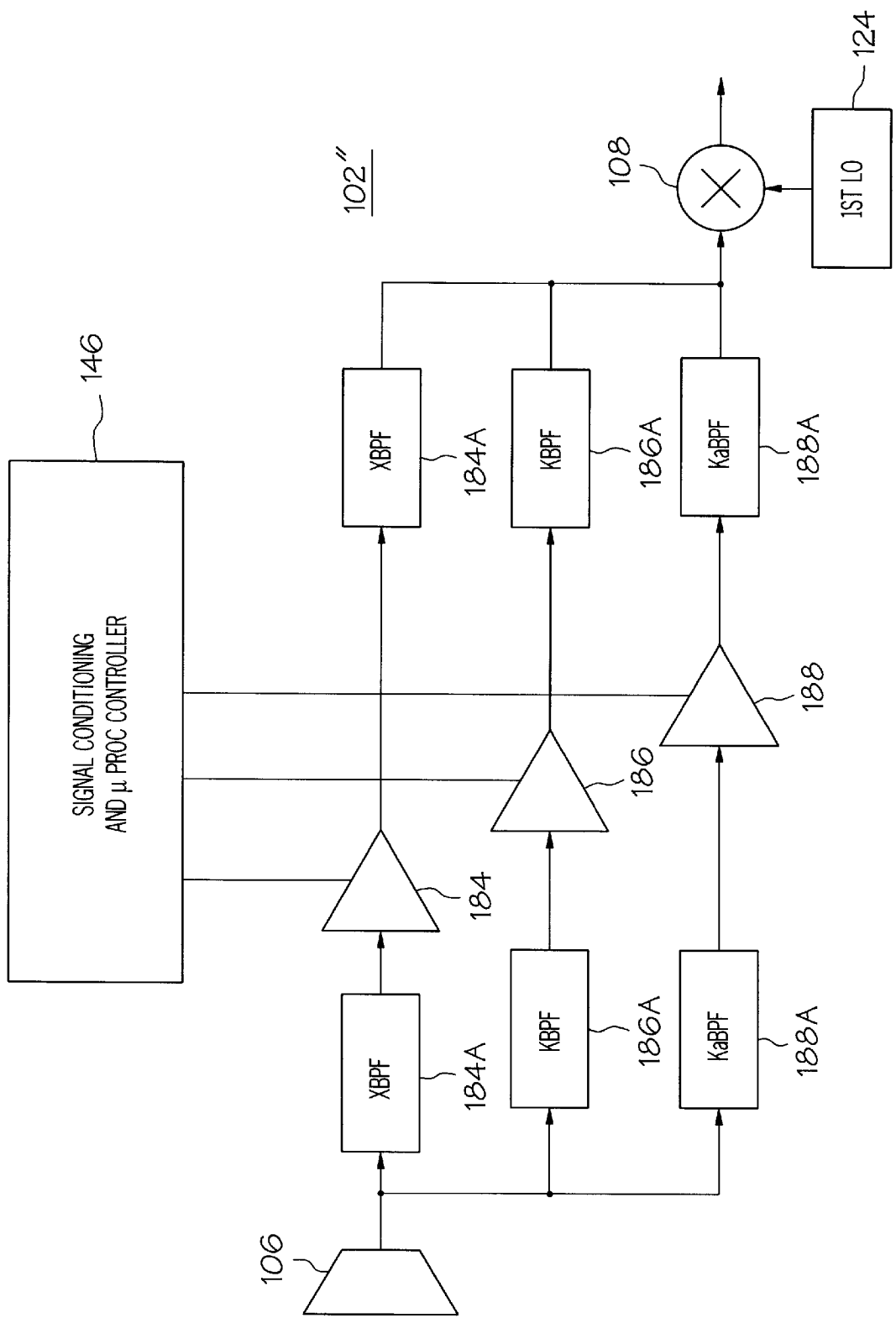

FIG. 3, wherein like elements are identified using the same reference numerals, illustrates a second embodiment of a single mixer input stage 102' that uses preamplifiers 180, 182 to couple X and K band signals, respectively, from the antenna 106 to the first mixer 108 for improved performance in those bands with $K_a$ band signals being passively coupled from the antenna 106 to the first mixer 108 for the sake of economy. X band bandpass filters 180A, K band bandpass filters 182A and a $K_a$ band bandpass filter 183 are also provided. FIG. 4, wherein like elements are identified using the same reference numerals, illustrates a third embodiment of a single mixer input stage 102" which provides preamplifiers 184, 186, 188 to couple all three police radar bands from the antenna 106 to the first mixer 108. X band bandpass filters 184A, K band bandpass filters 186A and $K_a$ band bandpass filters 188A are also provided. All three embodiments of the input stages of FIGS. 1, 3 and 4 utilize a single first mixer for economical handling of all three police radar bands.

In these embodiments, the preamplifiers are enabled one at a time as appropriate for scanning the corresponding bands. For the most improved noise figure, each preamplifier is designed with sufficient selectivity to reduce noise in its respective image bands to tolerable levels. The outputs of the preamplifiers are combined via passive frequency multiplexing performed by the bandpass filters 180A, 182A, 184A, 186A and 188A for input into a single mixer, the first mixer 108, for subsequent frequency conversion.

It is advantageous in radar detectors to receive multiple responses since the multiple responses frequently permit two or more radar bands, such as the K and $K_a$ bands or two frequencies within the very wide $K_a$ band, to be scanned simultaneously. As shown above, the frequency scheme for the radar detector 100 yields two responses approximately 1.3 Ghz apart that fall within the $K_a$ band if the $K_a$ band is coupled to the first mixer 108 passively or via a preamplifier having bandwidth sufficient to support both responses. The $K_a$ band signals thus coupled to the first mixer 108 can be swept by tuning the first LO 124 through a 1.3 Ghz range and the two responses cover the 2.6 Ghz required for sweeping the entire $K_a$ band. In comparison, if only a single response of the $K_a$ band was coupled to the mixer 108, the first LO 124 would have to tune the full 2.6 Ghz and the sweep time would double, assuming a fixed sweep rate.

However, when multiple responses are received and preamplifiers are used, the preamplifiers introduce noise at image frequencies thereby reducing the improvement in the noise figure which is attained by the preamplifiers. Thus, the input stages of FIGS. 3 and 4, better improve noise figure if they do not take advantage of scanning multiple responses; but, they consequently must devote more time to scanning since some or all of the receiver responses must now be swept independently.

It will be apparent to those skilled in the art that various combinations and alterations of preamplification are possible in accordance with this aspect of the radar detector 100. A particularly advantageous one of these is the result of a compromise between attaining lower noise figure and sweeping multiple responses. In particular, noise figure can be improved on the X and K bands by coupling these signals to the first mixer 108 using preamplifiers designed with sufficient selectivity to reduce noise in their respective image bands to tolerable levels while the $K_a$ band may be coupled to the first mixer 108 through a preamplifier which permits multiple responses to be swept in the $K_a$ band or passively for economy sake.

If the $K_a$ band preamplifier is sufficiently selective to prevent the passage of excess noise contributed by the K band response so that only the two noise paths for the $K_a$ band need be considered, a 3 dB penalty in noise figure arises from the dual responses. Blind adherence to the above described preamplification for the police radar bands would result in suppressing one of the $K_a$ band responses while somehow covering the 2.6 Ghz bandwidth of the $K_a$ band, thus attaining the 3 dB improvement. However, this arrangement would result in the loss of approximately 1.5 dB in the threshold sensitivity because the police radar detector is able to inspect the spectrum only half as often. Consequently, there would be a net improvement of only 1.5 dB accruing from all the effort expended to suppress the extra $K_a$ band receiver response. Worse, the same 1.5 dB loss in the threshold sensitivity would also be imposed on the X and K band sensitivity because of the nearly doubled sweep time entailed in covering all of the radar bands, the X band, the K band and the $K_a$ band.

Accordingly, a currently preferred embodiment of the radar detector 100 incorporates preselection to suppress the image noise in the X and K band preamplifiers but retains the receipt of dual responses in the $K_a$ band in spite of the 1.5 dB sensitivity penalty in the $K_a$ band. The sweep time of the preferred embodiment is only slightly longer than that required in a passive, multiple response design. This is because the $K_a$ band is 2.6 GHZ wide while the X and K bands are only 50 and 200 Mhz wide, respectively. Thus, the detector devotes the bulk of the sweep time to scanning the $K_a$ band and only a relatively modest increase in time is required to sweep the X and K band including frequency preselection.

Having thus described the invention of the present application in detail and by reference to preferred embodiments thereof, it will be apparent that modifications and variations are possible without departing from the scope of the invention defined in the appended claims.

What is claimed is:

1. A police radar detector comprising:

an antenna for receiving incoming electromagnetic signals;

a first local oscillator generating a first local oscillator signal which is swept through a range of frequencies to sweep the K and $K_a$ police radar bands during a sweep of said first local oscillator signal;

a first mixer coupled to said antenna and said local oscillator for mixing said incoming electromagnetic signals with said first local oscillator signal to generate a first intermediate frequency signal;

a first intermediate frequency amplifier operating at around 5 gigahertz and amplifying said first intermediate frequency signal; and detector circuitry coupled to said first mixer for detecting received electromagnetic signals within the K and $K_a$ police radar bands.

2. A police radar detector as claimed in claim 1 wherein said detector circuitry comprises a frequency modulation discriminator for generating a frequency modulation detection signal and said police radar detector further comprises:

modulation circuitry for connecting a modulation signal to said first local oscillator; and signal conditioning and control circuitry utilizing said frequency modulation detection signal to determine whether detected electromagnetic signals are within the K police radar band or within the $K_a$ police radar band.

3. A police radar detector as claimed in claim 1 further comprising:

a second local oscillator generating a second local oscillator signal at around 5.2 gigahertz; and a second mixer coupled to said first intermediate frequency amplifier and said second local oscillator to generate a second intermediate frequency signal at around 600 megahertz, said detector circuitry being coupled to said first mixer through said second mixer.

4. A police radar detector as claimed in claim 3 wherein said detector circuitry comprises a frequency modulation discriminator for generating a frequency modulation detection signal and said police radar detector further comprises:

modulation circuitry for connecting a modulation signal to said first local oscillator; and signal conditioning and control circuitry utilizing said frequency modulation detection signal to determine whether detected electromagnetic signals are within the K police radar band or within the $K_a$ police radar band.

5. A police radar detector as claimed in claim 3 wherein said detector circuitry comprises a frequency modulation discriminator for generating a frequency modulation detection signal and said police radar detector further comprises:

modulation circuitry for connecting a first modulation signal to said first local oscillator and a second modulation signal to said second local oscillator; and signal conditioning and control circuitry utilizing said frequency modulation detection signal to determine whether detected electromagnetic signals are within the K police radar band or within the $K_a$ police radar band.

6. A police radar detector as claimed in claim 5 wherein said first and second modulation signals are in quadrature relative to one another.

7. A police radar detector as claimed in claim 1 further comprises band switching circuitry coupled to said first mixer to switch said police radar detector to sweep the X police radar band.

8. A police radar detector as claimed in claim 7 wherein said first mixer comprises a pair of antiparallel diodes having a near side coupled to said antenna and a far side coupled to said first intermediate frequency amplifier, and said band switching circuitry comprises circuitry for coupling a dc bias to said first mixer.

9. A police radar detector as claimed in claim 7 wherein said first mixer dc bias is coupled to said far side of said first mixer.

10. A police radar detector as claimed in claim 2 further comprises band switching circuitry coupled to said first mixer to switch said police radar detector to sweep the X police radar band.

11. A police radar detector as claimed in claim 10 wherein said first mixer comprises a pair of antiparallel diodes having a near side coupled to said antenna and a far side coupled to said first intermediate frequency amplifier, and said band switching circuitry comprises circuitry for coupling a dc bias to said first mixer.

12. A police radar detector as claimed in claim 10 wherein said first mixer dc bias is coupled to said far side of said first mixer.

13. A police radar detector comprising:

an antenna for receiving incoming electromagnetic signals;

a first mixer coupled to said antenna for mixing said incoming electromagnetic signals with a first local oscillator signal to generate a first intermediate frequency signal;

a first local oscillator generating a first local oscillator signal which is swept through a range of frequencies to sweep the K police radar band and the $K_a$ police radar band during a single sweep of said first local oscillator signal;

a first intermediate frequency amplifier operating around 5 gigahertz and amplifying said first intermediate frequency signal;

a second local oscillator generating a second local oscillator signal around 5.2 gigahertz;

a second mixer coupled to said first intermediate frequency amplifier and said second local oscillator for generating a second intermediate frequency signal around 600 megahertz;

detector circuitry coupled to said second mixer and including a frequency modulation discriminator for generating a frequency modulation detection signal;

signal conditioning and control circuitry coupled to said detection circuitry;

modulation circuitry coupled between said signal conditioning and control circuitry and said first and second local oscillators for connecting a first modulation signal to said first local oscillator and a second modulation signal generated by said signal conditioning and control circuitry to said second local oscillator; and said signal conditioning and control circuitry utilizing said frequency modulation detection signal to determine whether a detected radar signal is within the K police radar band or the $K_a$ police radar band.

14. A police radar detector as claimed in claim 13 wherein said first local oscillator is swept through a frequency range of approximately 14.310 gigahertz to approximately 15.149 gigahertz.

15. A police radar detector as claimed in claim 13 wherein said first and second modulation signals are in quadrature relative to one another with synchronous quadrature correlation of said frequency modulation detection signal being performed by said signal conditioning and control circuitry to determine whether a detected radar signal is within the K police radar band or the $K_a$ police radar band.

16. A police radar detector as claimed in claim 15 wherein said signal conditioning and control circuitry comprises a processor for performing said synchronous quadrature correlation of said frequency modulation detection signal.

17. A police radar detector comprising:

an antenna for receiving incoming electromagnetic signals; and a heterodyne receiver connected to said antenna and including a mixer operable in the mixer's fundamental operating mode for sweeping said receiver to detect said electromagnetic signals within the K police radar band and the $K_a$ police radar band during a single sweep of said receiver.

18. A police radar detector as claimed in claim 17 further comprising:

modulation circuitry for modulating at least one local oscillator within said heterodyne receiver;

frequency detection circuitry for generating a frequency modulation detection signal; and signal conditioning and control circuitry responsive to said frequency modulation detection signal for determining whether detected radar signals are within the K police radar band or within the $K_a$ police radar band.

19. A method for operating a police radar detector comprising the steps of:

receiving electromagnetic signals;

providing a heterodyne receiver having a mixer driven by a local oscillator; and operating said mixer in a fundamental operating mode to detect received electromagnetic signals within the $K_a$ radar band and the K radar band during a single frequency sweep of said heterodyne receiver.

20. A method of operating a police radar detector as claimed in claim 19 further comprising the steps of:
   modulating said local oscillator of said heterodyne receiver with a modulation signal;
   detecting said modulation signal to generate frequency modulation detection signals; and
   determining whether detected electromagnetic signals are within the $K_a$ radar band or the K radar band based on said frequency modulation detection signals.

21. A method of operating a police radar detector as claimed in claim 19 wherein said local oscillator comprises a first local oscillator and said police radar detector further comprises a second mixer driven by a second local oscillator, said method further comprising the steps of:
   modulating said first local oscillator of said heterodyne receiver with a first modulation signal;
   modulating said second local oscillator of said heterodyne receiver with a second modulation signal;
   detecting said first and second modulation signals to generate frequency modulation detection signals;
   correlating said first and second modulation signals with said frequency modulation detection signals; and
   determining whether detected electromagnetic signals are within the $K_a$ radar band or the K radar band based on results of said correlating step.

22. A method of operating a police radar detector as claimed in claim 21 further comprising the step of switching said first local oscillator in said heterodyne receiver to detect ones of said electromagnetic signals within the X radar band.

23. A method of operating a police radar detector comprising the steps of:
   heterodyning received electromagnetic signals in a mixer driven by a local oscillator;
   operating said mixer in said mixer's fundamental operating mode by sweeping said local oscillator to detect said electromagnetic signals within the $K_a$ radar band and the K radar band in a single frequency sweep of said local oscillator;
   introducing a modulation signal into detected electromagnetic signals within the $K_a$ radar band and the K radar band; and
   determining whether said detected electromagnetic signals are within the $K_a$ radar band and the K radar band based on said modulation signal.

24. A method of operating a police radar detector comprising the steps of:
   heterodyning received electromagnetic signals in a receiver including a mixer driven by a local oscillator;
   operating said mixer in said mixer's fundamental operating mode;
   sweeping said local oscillator through a single frequency sweep to simultaneously sweep said electromagnetic signals within a plurality of frequency bands covering at least the $K_a$ radar band and the K radar band;
   modulating said local oscillator of said receiver with a modulation signal;
   detecting said modulation signal to generate frequency modulation detection signals; and
   determining whether said electromagnetic signals are within the $K_a$ radar band or the K radar band based on said frequency modulation detection signals.

* * * * *